May 30, 1967     A. A. NORDGREN     3,322,362
ALIGNING APPARATUS

Filed July 6, 1965     2 Sheets-Sheet 1

INVENTOR
Alfred A. Nordgren

BY DeLio and Montgomery
ATTORNEYS

May 30, 1967 A. A. NORDGREN 3,322,362
ALIGNING APPARATUS
Filed July 6, 1965 2 Sheets-Sheet 2
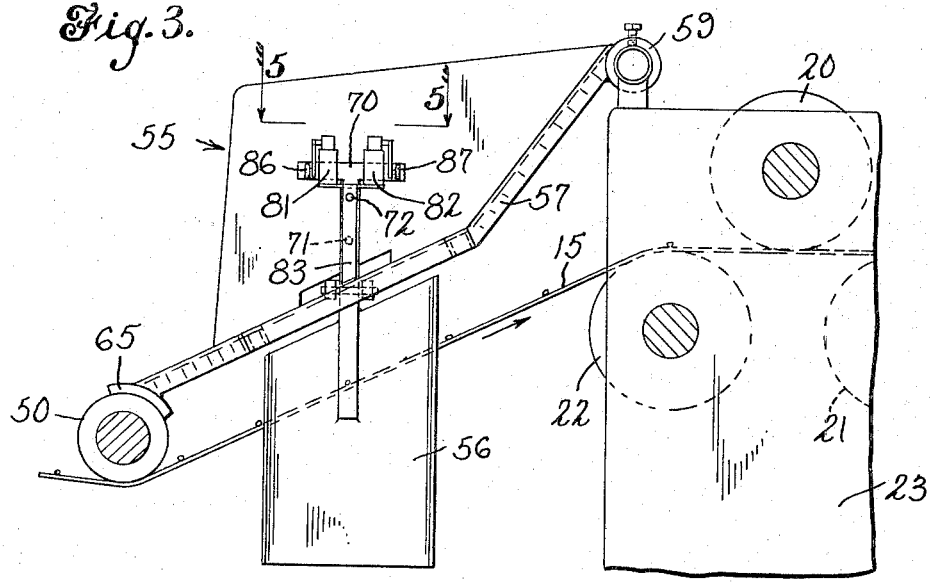
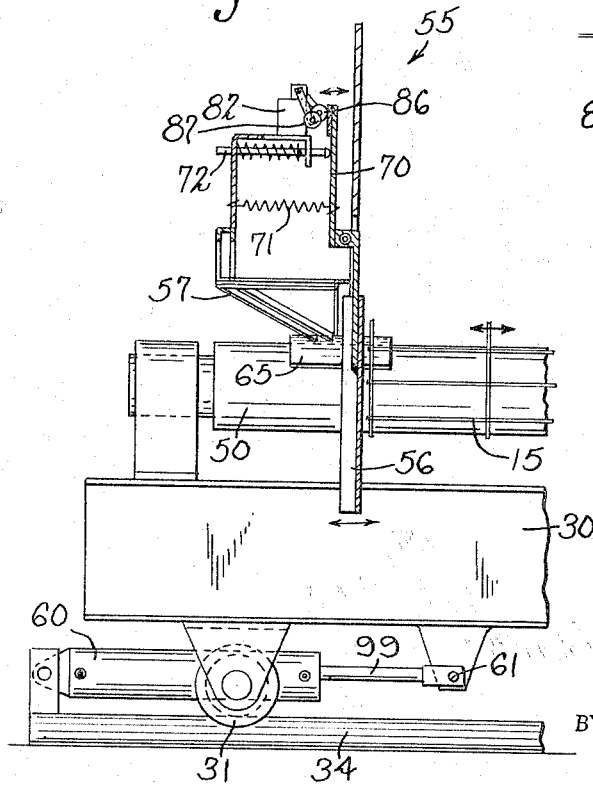
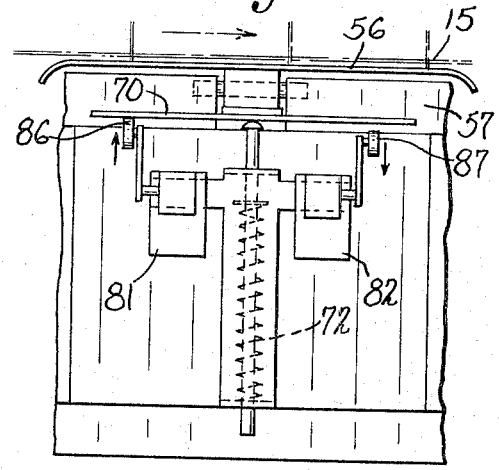
INVENTOR
Alfred A. Nordgren
BY
De Leo and Montgomery
ATTORNEYS Patented May 30, 1967

3,322,362
ALIGNING APPARATUS
Alfred Alling Nordgren, New Britain, Conn., assignor to
The Leonard Concrete Pipe Company, Inc., Hamden,
Conn., a corporation of Connecticut
Filed July 6, 1965, Ser. No. 469,497
4 Claims. (Cl. 242—57.1)

This invention relates to an aligning apparatus and more particularly to apparatus for automatically aligning sheet or mesh material with respect to a machine for severing pieces of the material.

The apparatus of this invention is particularly useful when combined with a machine for continuously cutting lengths of material from a roll of material fed into the cutting machine. This type of continuous cutting apparatus is disclosed in patent application Ser. No. 420,653 filed Dec. 23, 1964, entitled, "Machine Tool," in the name of the inventor of this invention, and now U.S. Patent No. 3,306,144 issued Feb. 28, 1967.

When feeding material into a continuous cutting apparatus, it is necessary that the material be properly aligned with respect to the cutting blade, such that the lengths of material are not cut at an angle. If the lengths of material were cut at an angle, the material would not be suitable for the purpose intended as, for example, in the concrete industry wherein wire mesh is utilized as a concrete reinforcement. For such use, the material must be accurately cut in order to later form the material into cylinders. Although it is possible to align the cutting blade itself with respect to the material, it has been found that when rolls of thick wire mesh material are to be cut continuously, aligning the blade is not practicable due to the length of time required to cut the wire.

In view of the foregoing, the applicant has invented a new and improved apparatus for properly aligning bulk sheet or mesh material with respect to a machine tool for cutting lengths of material.

Accordingly, it is an object of this invention to provide a new and improved apparatus for aligning sheet or mesh material with respect to a utilization device.

Another object of this invention is to provide a new and improved means for dispensing wire mesh material rolled on a roll support, in a proper aligned fashion to a cutting apparatus.

A further object of this invention is to provide a new and improved apparatus for sensing when the material is misaligned with respect to the utilization device.

An additional object of this invention is to provide a new and improved apparatus for sensing and correcting in accordance with the sensed information, the position of sheet or wire mesh material being fed into a cutting tool or utilization device.

Still other objects and advantages of this invention will in part be obvious and will in part be apparent from the specification.

The invention accordingly comprises the features of construction, combination of elements and arrangements of parts which will be exemplified in the construction hereinafter set forth and the scope of the invention will be indicated in the claims.

For a fuller understanding of the invention, reference is had to the following description taken in conjunction with the accompanying drawings, in which:

FIG. 3 is an enlarged side elevational view of the sensing mechanism of the aligning apparatus, partially in section, in accordance with this invention;

FIG. 4 is a sectional view taken along line 4—4 of FIG. 1 with certain parts broken away;

FIG. 5 is a sectional view taken along line 5—5 of FIG. 3; and

Figure 1:
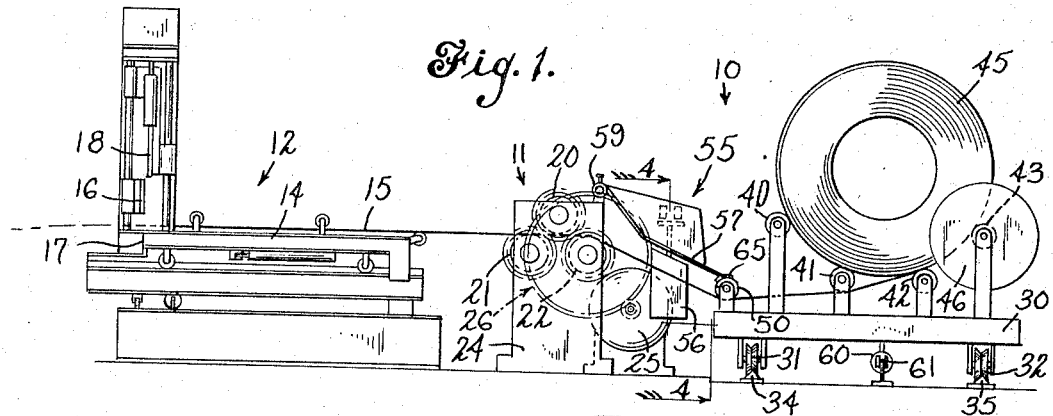
FIG. 1 is a side elevational view of the aligning apparatus dispensing wire to a cutting machine, according to this invention.
Figure 2:
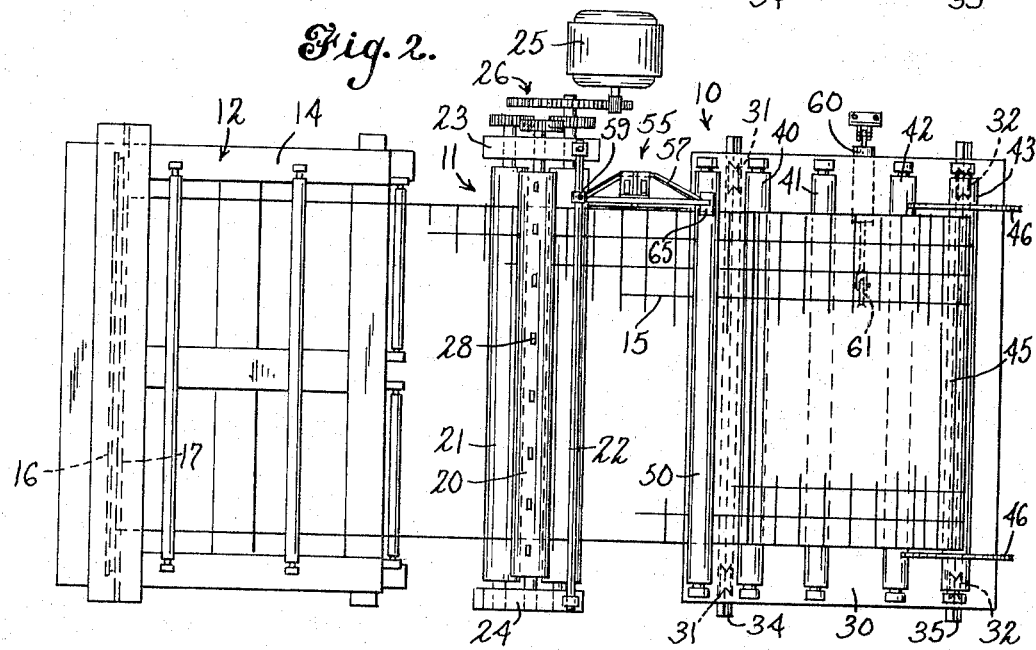
FIG. 2 is a top view of the aligning apparatus dispensing wire to a cutting machine, in accordance with this invention.

Referring now to FIGS. 1 and 2, there is shown a wire mesh feed aligning assembly 10 positioned adjacent to a drive roll assembly 11 for pulling the wire from the wire feed aligning assembly and providing the wire to a cutting machine shown at 12. The cutting machine may be of the type shown in copending patent application Ser. No. 420,-653, noted previously herein. Such wire cutting machine generally comprises a table 14 adapted for movement in a direction with the direction of feed of the wire across the table, so that the wire can be continuously fed while it is being cut. The wire mesh is generally shown at 15 and is shown passing under the top cutting blade 16 where it is severed between the top blade 16 and a lower cutting blade 17. The cutting machine also includes a clamping mechanism 18 for holding the wire in place during the time the wire 15 is moving with the table. The drive roll assembly 11 comprises a plurality of driven rolls 20–22 supported at their ends on their shafts by members 23 and 24 respectively. The rolls are driven by a motor 25 coupled by a gear assembly generally shown at 26 to the shafts of the rolls. The rolls 20–22 are driven in such a manner that the wire mesh material is unwound from the wire feed aligning assembly and continuously fed into the cutting machine 12. In order to insure that the wire is forced through the drive roll assembly, the top roll 20 is provided with a plurality of protrusions of a rectangular shape, one of which is shown at 28.

The wire feed aligning assembly 10 is shown comprising a base 30 having a plurality of guide wheels 31 and 32 positioned on its underside. These wheels are movable on tracks 34 and 35 respectively, such that the base will move in a direction substantially perpendicular to the direction of feed of the wire through the cutting machine. The direction of movement of the base member 30 is such that movement takes place in a plane substantially parallel to the top surface of the wire mesh material 15. Positioned on the top side of base 30 is a plurality of support rolls 40–43 which extend above the base in a manner adapted to support a reel 45 of the wire 15. The support rolls 40–42 ride on the inner side of the reel while support roll 43 has side members 46 which maintain reel 45 in position. This is accomplished by the sides 46 of support roll 43 enclosing a portion of reel 45 as shown more clearly in FIG. 2. These side members 46 prevent the reel from moving too far in either direction during the unreeling of the cross-stranded wire mesh from the roll due to the action of the drive roll assembly 11. Also included on the top side of base member 30 is a roll 50 for maintaining the wire 15 in a taut condition while being driven through the drive roll assembly 11.

The sensing mechanism is generally shown at 55 and includes a sensing plate or means 56 supported by a member 57 which is adjustable in a direction parallel to the top surface of the wire mesh on a support means 59 positioned on the drive roll assembly 11. The other side of support member 57 is slidably supported by roll 50 as shown in FIG. 3. In order to align the wire mesh 15 by moving the base 30 and thus the reel 45, in accordance with a signal provided by sensing mechanism 55, coupled to the underside of base 30 there is provided a hydraulic or, preferably, pneumatic cylinder 60 which is fixedly positioned at one end to a base and is coupled at its piston end to a bracket 61 on the underside of the base member 30.

Referring now to FIGS. 3-5 for a description of the sensing mechanism 55, there is shown the sensing plate 56 supported by member 57 which is adjustably mounted at 59 by a set screw along the drive roll assembly 11. The other end of member 57 is slidably supported by the drive roll 50 by the use of a shoe shown at 65. In this manner the sensing plate 56 is positioned such that it continuously senses the alignment of the wire mesh 15 with respect to the cutting edges 16 and 17 of the cutting machine 12. The sensing plate is positioned in contact with the wire mesh 15 such that movement of the wire 15 in a direction parallel to the top surface of the wire mesh 15 will cause sensing mechanism 55 to provide the signal to adjust the position of the reel and the wire mesh 15 with respect to cutting machine 12. The sensing plate 56 has a T-shaped extension plate 70, the combination being pivotally coupled to the supporting member 57 such that movement of the sensing plate in one direction will cause the extension plate to move in an opposite direction. In order to maintain the sensing plate 56 against the edge of wire mesh 15, there is provided a spring-balanced mechanism 71 and 72 for adjusting the position of the extension plate to thereby effect the position of the sensing plate 56.

Also positioned on supporting member 57 are two switches 81 and 82 which are selectively operated in response to the position of the extension plate 70. These switches are supported in an elevated position from support member 57 by a bracket 83. The switch 81 has a spring-loaded feeler arm including a roller 86 which is resiliently biased against the plate 70 while it is in its normal position. Upon the movement of the extension plate 70 in a direction as shown by the arrows, the switch 81 which is normally open but held closed, is opened inasmuch as spring-biased roller 86 will tend to move in the same direction as the direction of movement of the extension plate 70. The switch 82 is also provided with a roller 87 which is mounted such that it is positioned away from the T-shaped member 70 when it is in its normal position (when the wire is aligned). When the T-shaped member 70 moves in a direction as shown by the arrow on the right side of the drawing of FIG. 5, the switch 82 which is normally closed will open, thereby causing the hydraulic cylinder 60 to realign the reel and the wire mesh 15 with respect to the cutting machine 12. Thus the selective actuation of switches 81 and 82 in accordance with the position of the edge of the wire mesh 15 provides a means for controlling the alignment of the wire with respect to the cutting machine 12 and insuring that the wire mesh is cut in substantially rectangular sections.

Figure 6:
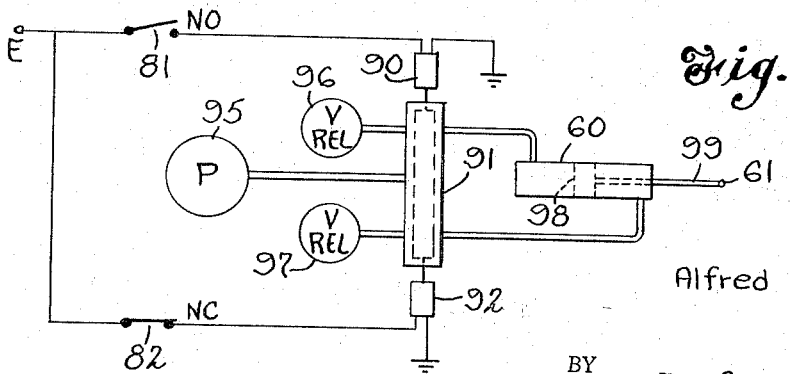
FIG. 6 is a schematic diagram of an electrical-pneumatic system suitable for controlling the apparatus according to this invention.

With reference to FIG. 6, there is shown an electrical pneumatic system suitable for controlling the apparatus according to this invention. The system of FIG. 6 includes the normally opened switch 81 and the normally closed switch 82. The switch 81 is coupled between a source of power E and a solenoid 90 of a four-way spring return spool valve 91 and the switch 82 is coupled between the source of power E and a solenoid 92 of the same valve 91. A four-way valve suitable for use in this system may be purchased from the Versa Engineering Company of Englewood, New Jersey.

The valve 91 is coupled at its input side to an air pump system 95 which provides air under pressure. Also coupled to the valve 91 are two speed relief valves 96 and 97 for permitting air to selectively leave valve 91 depending upon the position of the spool. The valve 91 is coupled at its output side to the cylinder 60 such that one output line enters on one side of a piston 98 of cylinder 60 and the other output line enters on the other side of piston 98.

In normal operation, the switches 81 and 82 are closed by the positioning of the plate 70 against roller 86 coupled to the switch 81 and away from the roller 87 coupled to the switch 82. Thus the two solenoids 90 and 92 are both energized, thereby retaining the valve spool of the valve 91 in a position to permit air to be forced around both sides of the piston 98. This will then cause a piston rod 99 of the cylinder coupled to the piston 98 to be retained in a fixed position. If the material 15 begins to move away from sensing plate 56, the switch 81 will open, thereby deenergizing solenoid 90. This will cause the spool of the valve 91 to move to a position to permit the air from the pump 95 to enter and exit from the cylinder 60, such that the piston 98 moves to return the material 15 back to its normal position. When the material has returned to a neutral position, the switch 81 will close once again and the system will be in equilibrium. If the material begins to move toward the roller 87, the switch 82 will open to return the material 15 to a neutral position in the same manner as described above.

It is to be understood that although a sensing plate is disclosed which mechanically contacts the edge of the wire mesh 15, other suitable sensing means as, for example, a photocell system or other type of visual or electronic system could be substituted in its place, although the mechanical system is preferable because of its simplicity.

It will thus be seen that the objects set forth above, among those made apparent from the preceding description, are efficiently attained and since certain changes may be made in the above construction without departing from the spirit and scope of the invention, it is intended that all matter contained in the above description or shown in the accompanying drawings shall be interpreted as illustrative and not in a limiting sense.

It is also be understood that the following claims are intended to cover all the generic and specific features of the invention herein described and all statements of the scope of the invention which, as a matter of language, might be said to fall therebetween.

What is claimed is:

1. A system for providing wire mesh material having a plurality of elongated wire strands joined together by a plurality of wire cross strands which are spaced apart from each other on said elongated wire strands to a utilization device from a rotating reel of said material, said system comprising support means for holding the reel, said support means movable substantially parallel to the axis of rotation of the reel, means for moving the support means, sensing means responsive to the position of an edge of the material for controlling the means for moving the support means, said sensing means including a pivotally supported plate for continuously engaging an edge of the material as the material is expelled from the reel, said plate portion in contact with the edge of the material having a dimension greater than the distance between adjacent cross strands of the material, and a plurality of electrical switch means controlled by the position of said plate to control said moving means.

2. A system according to claim 1, including a plurality of feelers, one of said feelers positioned to continuously engage said plate and another of said feelers positioned to be engaged by said plate, said feelers controlling the operation of said switches.

3. A system according to claim 2, wherein said means for moving the support means comprises a fluid-actuated cylinder having a piston coupled to said means for moving the support means and valve means including a plurality of solenoid means controlled by said plurality of switches, said solenoids controlling a valve which controls the flow of fluid into and out of the cylinder, said sensing means positioning said valve such that fluid is forcibly continuously provided on either side of the piston to positively hold the support means in place except when the support means is moved as a result of the movement of the pivotal plate.

4. A system for providing wire mesh material having a plurality of elongated wire strands joined together by a plurality of wire cross strands which are spaced apart from each other on said elongated wire strands to a utilization device from a rotating reel of said material, said system comprising support means for holding the reel, said support means movable substantially parallel to the axis of rotation of the reel, means for moving the support means, sensing means responsive to the position of an edge of the material for controlling the means for moving the support means, said sensing means including a pivotally supported plate for continuously engaging an edge of the material as the material is expelled from the reel, said plate portion in contact with the edge of the material having a dimension greater than the distance between adjacent cross strands of the material, said means for moving the support means comprising a cylinder having a piston and valve means, said sensing means controlling said valve means to positively hold the piston in place by forcibly providing fluid to either side of the piston except when the support means is being moved.

References Cited

UNITED STATES PATENTS

| | | | |
|---|---|---|---|
| 1,945,981 | 2/1934 | Quinby | 242—57.1 |
| 2,108,232 | 2/1938 | Nash | 242—57.1 |
| 2,203,181 | 6/1940 | Potdevin et al. | 242—57.1 |
| 2,488,294 | 11/1949 | Hornbostel | 242—57.1 X |
| 2,640,660 | 6/1953 | Winkler et al. | 242—57.1 |
| 2,672,198 | 3/1954 | Jones et al. | 226—19 X |
| 2,741,440 | 4/1956 | Sutherland | 242—57.1 |
| 2,968,449 | 1/1961 | Hajos | 242—57.1 |
| 3,232,547 | 2/1966 | Thiede et al. | 242—57.1 |

FRANK J. COHEN, *Primary Examiner.*

GEORGE F. MAUTZ, *Examiner.*